(No Model.)
H. N. B. GIUSEPPI.
AERIAL RAILWAY.
No. 420,154. Patented Jan. 28, 1890.
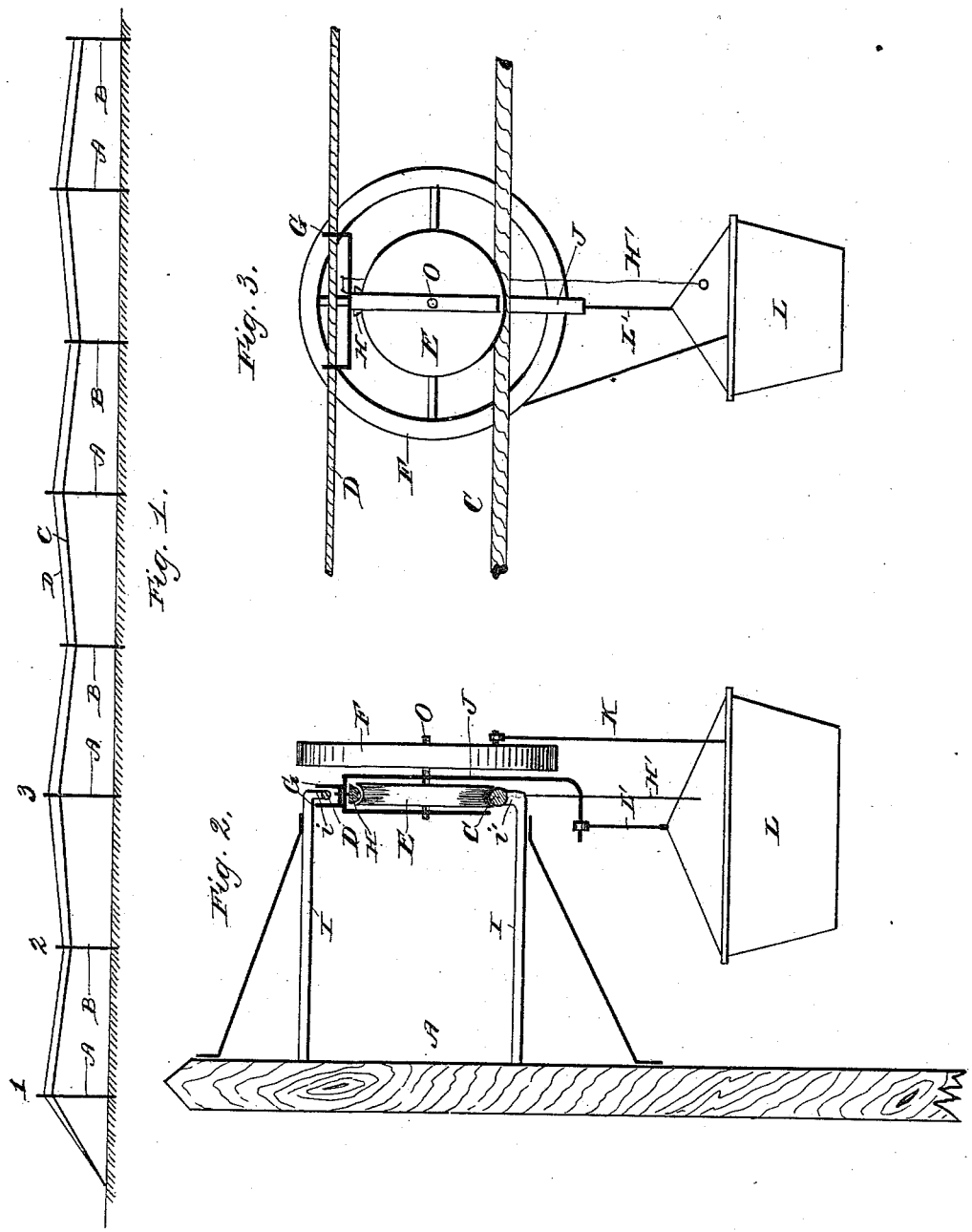

UNITED STATES PATENT OFFICE.

HENRI NONCE BENOIT GIUSEPPI, OF LURI, CORSICA, FRANCE.

AERIAL RAILWAY.

SPECIFICATION forming part of Letters Patent No. 420,154, dated January 28, 1890.

Application filed September 25, 1889. Serial No. 324,984. (No model.) Patented in France September 17, 1887, No. 185,925.

*To all whom it may concern:*

Be it known that I, HENRI NONCE BENOIT GIUSEPPI, a citizen of the French Republic, residing at Luri, Corsica, in France, have invented certain new and useful Improvements in Aerial Railways, (for which Letters Patent have been granted in France under date of September 17, 1887, No. 185,925,) of which the following is a full, clear, and exact description.

My invention has relation to aerial railways or apparatus designed to convey persons or merchandise from one point to another along a way or track arranged above the ground, and has for its objects, first, to provide the vehicle or car which receives the person or merchandise to be transported with means which, when the car is started down an incline, will exert a tendency to cause said vehicle to ascend an incline arranged reversely to the other; secondly, to provide a guide rope or cable in addition to the supporting-cable for the vehicle, which is designed to prevent any swaying of the vehicle and car when running along the way; and, thirdly, to simplify the construction of the vehicle.

The invention consists in the combinations of parts, as well as the construction and relative arrangement thereof, all as hereinafter fully described, and specifically pointed out in the appended claims.

In the accompanying drawings, Figure 1 is a side elevation illustrating the arrangement of the way along which the vehicle is designed to travel; Fig. 2, an end elevation illustrating the manner of supporting the vehicle as well as the manner of supporting the cables. Fig. 3 is a side view of the vehicle detached and a portion of the cables.

The way upon which the vehicle and its car are designed to travel is constructed in the following manner:

A indicates uprights of any suitable height, placed in the ground at a suitable distance apart. Secured to each of the uprights are arms I I, the outer ends of the upper ones of which are bent downwardly, as at *i*, while the corresponding ends of the lower arms are bent upwardly, as at *i'*. These arms I I are designed to support steel cables C D, which are secured to the bent ends of the arms in any suitable manner.

The cable C is designed to serve as the supporting-cable for the vehicle, upon which cable said vehicle travels, while the cable D is designed to serve merely as a guide-cable to prevent swaying of the vehicle when running along the way.

B indicates uprights, secured in the ground at points intermediate of the uprights A, and are provided with supporting-arms for the cables similar to those provided for the uprights A.

The uprights B are of less height than the uprights A, whereby when the cables are secured in position reverse inclines will be formed in the way, as shown in Fig. 1.

The construction of the vehicle as well as the manner of supporting the same are as follows:

L indicates the car of the vehicle, which car may have any desired construction according to the purposes for which it is used. Said car is supported by means of a chain or rope L' from the lower end of the frame or hanger J of the vehicle, which hanger is at its upper portion formed into a yoke, between the arms of which is arranged a pulley E, which is rigidly mounted upon a shaft O, which passes through and has its bearings in the arms of the yoke, said pulley, as shown, being supported by and adapted to run along the lower cable C.

For the purpose of preventing any swaying of the vehicle while running along the way, the hanger J is provided with vertical arms G, which, when the vehicle is in position, embrace the cable D.

It will be seen that when the vehicle is started from the highest point of the way—*i. e.*, from the point 1, Fig. 1—it will descend by gravity toward the lower point 2, and its momentum will carry it partly up the reverse incline toward the point 3. Additional force would, however, have to be applied to cause it to ascend entirely up the incline to the point 3, and in case the vehicle were loaded the amount of force required would be considerable.

For the purpose of reducing the amount of force required to a minimum, and to assist the vehicle to run up the reverse incline to a point in very close proximity to the point 3, I extend one end of the shaft O beyond the hanger J and mount thereupon a fly-wheel F.

It will be seen that when the vehicle is descending from the point 1 the fly-wheel acquires considerable momentum, which, when the vehicle reaches the point 2, will be sufficient to cause the vehicle to run up the reverse incline very nearly to the point 3, and in order that the vehicle may be made to fully reach that point I attach one end of a rod K to the fly-wheel, the other end of which rod is adapted to be grasped by a person in the car, who will impel the vehicle along by turning the fly-wheel by means of said rod K.

In order that the vehicle may be stopped at any point of its travel or its motion retarded, any suitable brake mechanism may be employed which is adapted to be operated by a person in the car—as, for instance, a brake-shoe H, pivoted to the hanger J and adapted to be operated by means of a rod H'.

It will be seen that with my arrangement of way the latter can be used also for the return-way for the empty car, and obviates the necessity of constructing two ways as ordinarily—one for conducting the car to the point of destination and the other for returning the car to the point of starting.

What I claim, and desire to secure by Letters Patent, is—

1. In an aerial railway, the combination, with a vehicle, and a pulley carried thereby, of a cable upon which said pulley is mounted and adapted to travel, and a fly-wheel mounted upon the shaft of said pulley, for the purpose specified.

2. The combination, with the uprights A B, arranged as described, the supporting-arms I I, secured thereto, and the cables C D, secured to said arms I I, of the hanger J, supporting the car L, the pulley E, mounted upon the shaft O, having its bearings in said hanger and running upon the cable C, the arms G, secured to the hanger and embracing the cable D, and the fly-wheel F, mounted upon the shaft O, as and for the purpose specified.

In testimony that I claim the foregoing I have hereunto set my hand this 7th day of September, 1889.

HENRI NONCE BENOIT GIUSEPPI.

Witnesses:
 E. CORNHOUSE,
 R. J. PRESTON.